United States Patent
Wozniak et al.

(10) Patent No.: US 10,117,091 B2
(45) Date of Patent: Oct. 30, 2018

(54) METHOD FOR ADMINISTERING LIFE CYCLES OF COMMUNICATION PROFILES

(71) Applicant: IDEMIA FRANCE, Colombes (FR)

(72) Inventors: Tomasz Wozniak, Colombes (FR); Jérôme Dumoulin, Colombes (FR)

(73) Assignee: IDEMIA FRANCE, Colombes (FR)

( * ) Notice: Subject to any disclaimer, the term of this patent is extended or adjusted under 35 U.S.C. 154(b) by 0 days.

(21) Appl. No.: 15/511,091

(22) PCT Filed: Sep. 14, 2015

(86) PCT No.: PCT/FR2015/052445
§ 371 (c)(1),
(2) Date: Mar. 14, 2017

(87) PCT Pub. No.: WO2016/042241
PCT Pub. Date: Mar. 24, 2016

(65) Prior Publication Data
US 2017/0265059 A1    Sep. 14, 2017

(30) Foreign Application Priority Data
Sep. 15, 2014  (FR) ..................... 14 58634

(51) Int. Cl.
*H04M 1/00*    (2006.01)
*H04W 8/18*    (2009.01)
(Continued)

(52) U.S. Cl.
CPC .......... *H04W 8/183* (2013.01); *H04B 1/3816* (2013.01); *H04W 60/005* (2013.01)

(58) Field of Classification Search
CPC ... H04W 8/183; H04W 60/005; H04B 1/3816
(Continued)

(56) References Cited

U.S. PATENT DOCUMENTS

| 9,537,858 B2* | 1/2017 | Ziat | H04W 12/08 |
| 2012/0302284 A1* | 11/2012 | Rishy-Maharaj | H04W 12/04 |
| | | | 455/552.1 |
| 2013/0152159 A1 | 6/2013 | Holtmanns et al. | |

OTHER PUBLICATIONS

Alfredo Ruscitto (Examiner}, International Search Report dated Feb. 26, 2016, International Application No. PCT/FR2015/052445, pp. 1-7 (Including English Translation).
(Continued)

*Primary Examiner* — Sanh Phu
(74) *Attorney, Agent, or Firm* — MH2 Technology Law Group, LLP (57) ABSTRACT

A method for administering life cycles of communication profiles that are managed by a subscriber identity module (100) embedded in a telecommunications terminal (110) may be performed by the module (100), which is suitable for using at least one process for administering the life cycles of communication profiles. The process uses a set of at least one command and/or of at least one rule. The method includes operations for receiving (B610) a message (M610) issued by the terminal (110) and representative of the capabilities of the terminal (110); selecting or not selecting (B615) the set used by the process as a function of the capabilities of the terminal (110); and if the set is selected, administering at least one life cycle of at least one of the profiles by using the set of at least one command and/or of at least one rule.

21 Claims, 8 Drawing Sheets (51) Int. Cl.
  *H04W 60/00* (2009.01)
  *H04B 1/3816* (2015.01)
(58) Field of Classification Search
  USPC .......................................................... 455/558
  See application file for complete search history.

(56) References Cited

OTHER PUBLICATIONS

Author Unknown, "Reprogrammable SIMs: Technology, Evolution and Implications Final Report", CSMG Report, Sep. 25, 2012, Retrieved from the Internet Jul. 2, 2014: http://stakeholders.ofcom.org.uk/binaries/research/telecoms-research/reprogrammable-sims.pdf, pp. 1-96.

Author Unknown, "Smart Cards; Embedded UICC; Requirements Specification (Release 12)", ETSI Tech. Spec. 103 383, V12.5.0, Aug. 15, 2014, pp. 1-26.

Author Unknown, "Smart Cards; Embedded UICC; Technical Specification (Release 12)", ETSI Tech. Spec. 103 384, V0.8.0, Jul. 11, 2014, pp. 1-18.

Author Unknown, "ISO/IEC 7816-4: Identification cards—Integrated circuit cards—Part 4: Organization, security and commands for interchange", Jan. 15, 2005, Retrieved from the Internet May 6, 2015: http://www.embedx.com/pdfs/IS0_STD_7816/info_isoiec7816-4{ed2.0}en.pdf, pp. 1-90.

* cited by examiner

| Profile | Identifier | Active? | Priority order | Most recently activated profile? | Address |
|---------|-----------|---------|----------------|----------------------------------|---------|
| P1 | ID1 | SA1=1 | SO1 | SDA1 | @1 |
| P2 | ID2 | SA2=0 | SO2 | SDA2 | @2 |
| . | . | . | . | . | . |
| . | . | . | . | . | . |
| . | . | . | . | . | . |
| Pn | IDn | SAn=0 | SOn | SDAn | @n |

METHOD FOR ADMINISTERING LIFE CYCLES OF COMMUNICATION PROFILES

CROSS-REFERENCE TO RELATED APPLICATIONS

This application is a U.S. National Stage application of International Application No. PCT/FR2015/052445 filed 14 Sep. 2015, which claims priority to French Application No. 1458634 filed 15 Sep. 2014, the entire disclosures of which are hereby incorporated by reference in their entireties.

BACKGROUND OF THE INVENTION

The present invention relates to a method for administering life cycles of communication profiles managed by a subscriber identity module embedded or inserted in a telecommunications terminal.

In known manner, in order to be able to communicate with a given telecommunications network, wireless telecommunications terminals, e.g. such as mobile telephones or the equivalent, are designed to co-operate with an identity module of a subscriber to that mobile telephone network, also known as a universal integrated circuit chip (UICC) or as a UICC module.

A UICC module may be in the form of a subscriber identity module (SIM) card suitable for being inserted in an appropriate telecommunications terminal. Such a SIM card contains a set of files known as "personalization data" or as a "communication profile", which files contain subscription data suitable for giving access to the network, and in particular a key and a unique international mobile subscriber identity (IMSI) associated with a particular subscription of a user with an associated mobile network operator. Such a communication profile is standardized.

The profile is stored in permanent manner in a read only memory (ROM) of the SIM card so the SIM card is not reprogrammable. That makes it possible in particular to reduce the risk of fraud relating to the identity of the user by making it more difficult to modify or duplicate the SIM card or its subscription data.

Consequently, the only way for a user to change mobile network operator is generally manually to replace the current SIM card in the mobile telephone with a new SIM card issued by a new operator selected by the user. The new SIM card contains the subscription data needed to access the network and the services specific to the new operator.

A UICC module may also be in the form of an embedded subscriber identity module (eUICC), enabling its user to change operator without needing to physically replace the eUICC module in the telecommunications terminal. Such eUICC modules are more recent and they are defined in a document ETSI TS 103 383 entitled "SmartCards, embedded UICC, requirements specification" dated April 2014 (version 12.4.0). That document made by the European Telecommunications Standards Institute (ETSI) defines an eUICC module as a secure hardware element of small size, that is not easily accessible or replaceable, and that makes it possible to switch from one profile to another in secure manner.

The eUICC module is suitable for containing a plurality of communication profiles, each communication profile, when active, giving the terminal access in secure manner to an operator's network and to the services defined by the profile in question. It is thus possible to change operator or to modify access to services by changing the active communication profile in the eUICC module.

A communication profile is installed, uninstalled, activated, and/or deactivated by means of a process of administering the life cycle of a profile. This process may also serve to administer the files of communication profiles and to switch from one profile to another.

Various processes exist for administering the life cycle of a communication profile. Each of these processes may make use of one or more specific commands, that need not be supported by another process. Specifically, commands of the "GSMA" and "ETSI" types are not uniform at present. Other processes, such as those disclosed in application U.S. 2012/0221292 are not standardized. Furthermore, a given command may be interpreted in different ways as a function of the process of administering under consideration (i.e. in application of different rules).

There thus exist problems of compatibility between a module and a terminal when the module and the terminal do not support the same process of administering the life cycle of a communication profile, and this non-compatibility can give rise errors in the operation of the module and/or of the terminal.

One of the objects of the invention is to avoid such problems of compatibility.

OBJECT AND SUMMARY OF THE INVENTION

To this end, the present invention provides an administering method for administering life cycles of communication profiles, the profiles being managed by a subscriber identity module embedded in a telecommunications terminal, the method being performed by the module, each profile being configured to enable the terminal to communicate with a mobile telephone network in compliance with the communication profile when the communication profile is active, said module being suitable for using at least one process of administering, the process being suitable for administering the life cycles of each of the profiles, the process using a set of at least one command and/or at least one rule, the method comprising the steps of:
  receiving a message issued by the terminal and representative of the capabilities of the terminal;
  selecting or not selecting the set used by the process as a function of the capabilities of the terminal; and
  if the set is selected, administering at least one life cycle of at least one of the profiles by using the set of at least one command and/or of at least one rule.

Thus, the module selects a set of at least one command and/or of at least one rule enabling at least one life cycle of at least one of the profiles to be administered as a function of the capabilities of the terminal.

The invention supports a plurality of particular situations:
  either the message issued by the terminal includes explicitly the capability of the terminal to support the process of administering supported by the module;
  or else the message issued by the terminal includes implicitly the capability of the terminal to support the process of administering supported by the module, and the module deduces this capability from said content of the message.

In the second situation (message including the capability of the terminal implicitly):
  either the message has no information about the capability of the terminal for supporting the process of administering supported by the module, from which the module deduces that the terminal does not support the process of administering;

or else the module deduces the capability of the terminal to support the process of administering supported by the module from the capabilities transmitted by means of the message issued by the terminal.

In a particular implementation, the message issued by the terminal includes explicitly the capability of the terminal to use (or support) the process.

In a particular implementation, the step of selecting or not selecting the set is also a function of the capabilities of the module.

In a particular implementation, the method further comprises the steps of:
  receiving a command for selecting a profile as issued by the terminal; and
  selecting one of the profiles.

In a particular implementation, the communication profile is selected depending on a predefined selection rule stored in a non-volatile memory of the module.

In a particular implementation, the rule for selecting a profile is a rule from among the following rules:
  selecting the most recently activated communication profile of the module;
  selecting a priority communication profile in a list stored in the module;
  selecting the sole communication profile of the embedded subscriber identify module; or
  selecting a communication profile specified in the command for selecting a communication profile.

In a particular implementation, the method further includes a step of issuing a message to the terminal including information about the capabilities of the module.

In a particular implementation, the message includes information about the capabilities of the module includes:
  information about the process of administering used by the module; and/or
  the number of communication profiles stored in the module; and/or
  the type of file system supported by the module; and/or
  information about the selected communication profile.

In a particular implementation, the message including information about the capabilities of said module corresponds to at least one "BER-TLV" type object defined by the ISO 7816-4 standard or by the ETSI TS 102.221 standard.

The present invention also provides a method for administering life cycles of communication profiles, the profiles being supported by a telecommunications terminal suitable for co-operating with a subscriber identity module embedded or inserted in the terminal, the method being performed by the terminal,
  each profile being configured to enable the terminal to communicate with a mobile telephone network in compliance with the communication profile when the communication profile is active,
  the terminal being suitable for using at least one process of administering, the process being suitable for administering the life cycles of each of the profiles, the process using a set of at least one command and/or of at least one rule,
  the method including the following steps:
    issuing a message representative of the capabilities of the terminal to the module;
    receiving a message including information about the capabilities of the module, the message coming from the module;
    selecting or not selecting the set used by the process as a function of the capabilities of the module; and
    if the set is selected, administering at least one life cycle of at least one of the profiles by using the set of at least one command and/or of at least one rule.

In a particular implementation, the method is performed the first time the telecommunications terminal is started.

In a particular implementation, the method further comprises the step of:
  issuing a command for selecting a communication profile to the module.

In a particular implementation, the command for selecting a communication profile complies with the "select file" APDU command defined by the ISO 7816-4 standard.

In a particular implementation, the message issued by the terminal corresponds to a message issued using the "terminal profile" APDU command defined by the ESTI TS 102.221 standard, further including additional data specifying that the terminal is suitable for supporting the process of administering.

The present invention also provides a subscriber identity module embedded in a telecommunications terminal,
  the module being suitable for managing a plurality of communication profiles,
  each profile being configured to enable the terminal to communicate with a mobile telephone network in compliance with the communication profile when the communication profile is active,
  the module being suitable for using at least one process of administering, the process being suitable for administering the life cycles of each of the profiles, the process using a set of at least one command and/or at least one rule,
  the module comprising:
    means for receiving a message issued by the terminal, the message being representative of the capabilities of the terminal; and
    means for selecting or not selecting the set used by the process, as a function of the capabilities of the terminal; and
    means for administering at least one life cycle of at least one of the profiles, using the set of at least one command and/or of at least one rule, if said set is selected.

In a particular embodiment, the means for selecting or not selecting a set select the set as a function also of the capabilities of the module.

The present invention also provides a telecommunications terminal suitable for co-operating with a subscriber identity module embedded or inserted in the terminal,
  the terminal being suitable for supporting a plurality of communication profiles,
  each profile being configured to allow the terminal to communicate with a mobile telephone network in compliance with the communication profile when the communication profile is active,
  the telecommunications terminal being suitable for using at least one process of administering, the process being suitable for administering the life cycles of each of the profiles, the process using a set of at least one command and/or of at least one rule,
  the terminal including:
    means for sending a message representative of the capabilities of the terminal to the module;
    means for receiving a message including information about the capabilities of the module, the message coming from the module; and means for selecting or not selecting the set used by the process as a function of the capabilities of the module; and means for administering at least one life cycle of at least one of the profiles by using the set of at least one command and/or of at least one rule, if said set is selected.

The present invention also provides a computer program including instructions for executing steps of a method as defined above when said program is executed by a processor.

The present invention also provides a processor-readable data medium storing a computer program including instructions for executing steps of an administering method as defined above.

BRIEF DESCRIPTION OF THE DRAWINGS

Other characteristics and advantages of the present invention appear from the following description made with reference to the accompanying drawings, which show an implementation having no limiting character. In the figures.

DETAILED DESCRIPTION OF EMBODIMENTS

Figure 1:
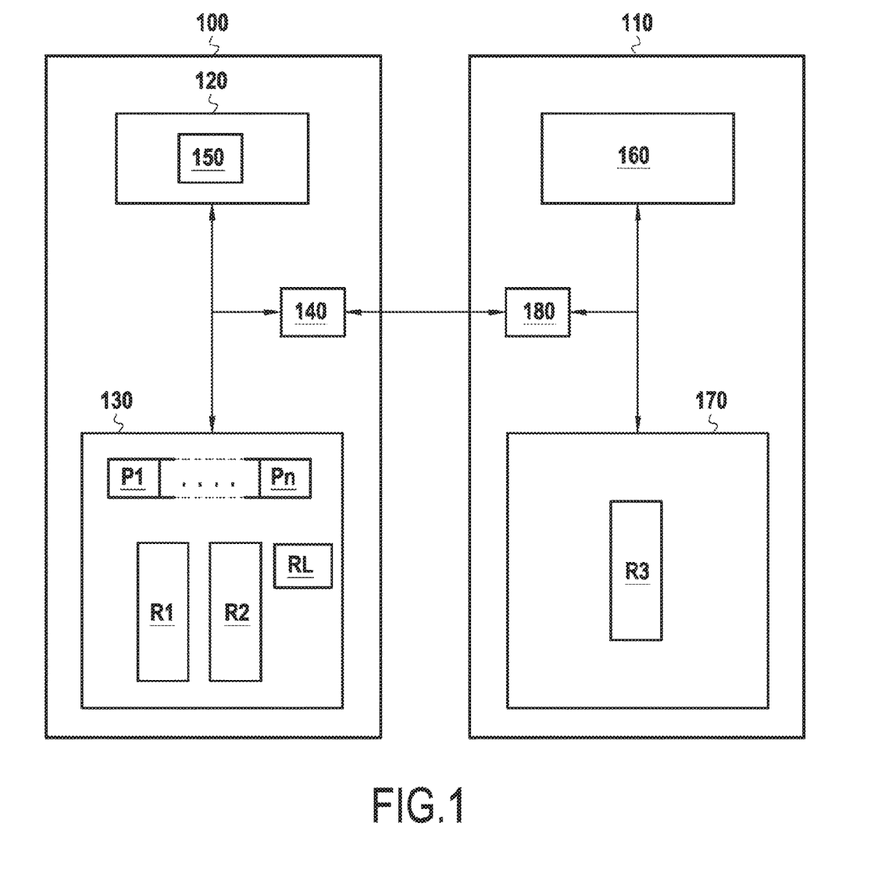
FIG. 1 schematically represents a subscriber identity module in accordance with a particular embodiment of the invention, this module being embedded in a telecommunications terminal in accordance with a particular embodiment of the invention.

FIG. 1 shows a subscriber identity module 100 in accordance with a particular embodiment of the invention, the subscriber identity module 100 being embedded in a telecommunications terminal 110 in accordance with a particular embodiment of the invention.

In the example of FIG. 1, the subscriber identity module 100 is an eUICC card. By way of example, this eUICC card is soldered or integrated in the terminal 110.

This module is suitable for managing a plurality of communication profiles P1-Pn. Each of these profiles P1-Pn has a life cycle, which begins when the profile P1-Pn is installed and which ends when the profile P1-Pn is uninstalled. During the life cycle, the profile is thus installed and uninstalled, but can also be activated and deactivated. The files of the profile may also be administered during its life cycle.

Furthermore, the module 100 is suitable for supporting, i.e. for using, at least one process of administering a profile life cycle, the process being suitable for administering the life cycles of each of said profiles P1-Pn. The process makes use of a set of at least one command and/or at least one rule.

The term "process of administering a profile life cycle" is used to mean a process enabling communication profiles to be installed, uninstalled, activated, and deactivated. The process may also enable the files of communication profiles to be administered and enable switching to be performed from one profile to another.

The command and/or the rule used by a process of administering may be non-standard. Thus, another process of administering may be unable to implement the command and/or the rule, and may implement a different command and/or rule.

The term "command" is used to mean a computer command, i.e. an order to execute a task.

The term "rule" is used to mean a rule for interpreting a command that has been received and for responding to that command.

In addition, the terminal 110 is suitable for supporting, i.e. for using, at least one process of administering the life cycles of profiles. The process may be the same process as the process supported by the module 100, or it may be a different process.

In an example, one of the processes of administering is a process of the "enable/disable" type or a process making use of a system of files for "administering" profiles used by the terminal in order to select profiles.

In an example, the command and/or the rule used by a process of administering relates to creating an exchange protocol while activating a secure channel. Specifically, certain profiles use certificates for this purpose, while other profiles use symmetric or asymmetric keys for this purpose.

The module 100 includes an operating system 120, e.g. stored in a ROM. The subscriber identity module 100 also includes a rewritable non-volatile memory 130 and a communication interface 140.

The operating system 120 includes a profile management module 150.

Typically, the rewritable non-volatile memory 130 is an electrically erasable programmable read only memory (EEPROM) or a flash memory. The non-volatile memory 130 also includes a plurality of communication profiles P1-Pn.

Each profile P1-Pn is a set of files configured to enable the terminal to communicate with a mobile telephony network associated with a particular network operator, whenever said communication profile P1-Pn is active.

Figure 4A:
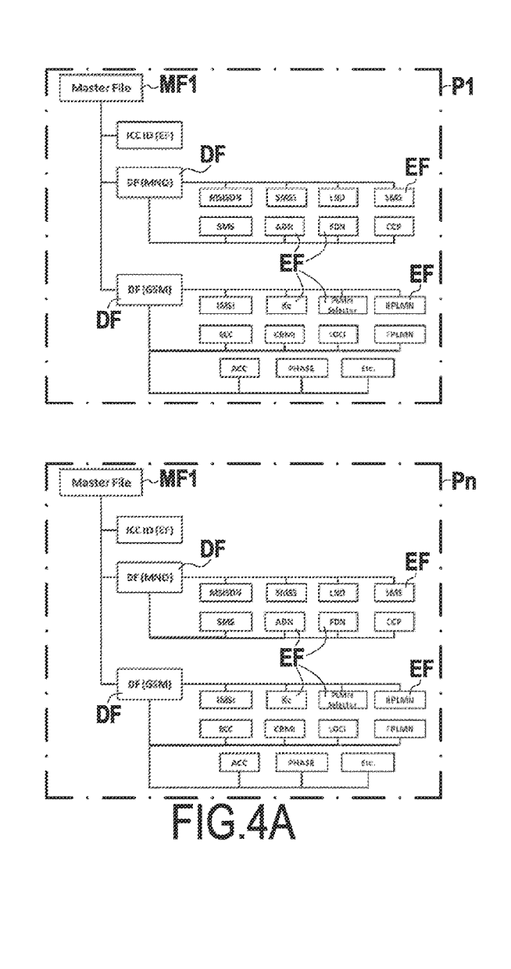
FIG. 4A shows one of various communication profile configurations stored in the FIG. 1 module.

In an example, the profiles P1-Pn are organized with the configuration shown in FIG. 4A. In this first configuration, each profile P1-Pn comprises:

a main directory or "master file" MF1;
secondary directories or "dedicated files" DF; and
elementary files EF.

The elementary files may in particular include subscription data (e.g. identifiers (IMSI, etc.), cryptographic keys, algorithms (e.g. authentication algorithms) . . . ).

Figure 4B:
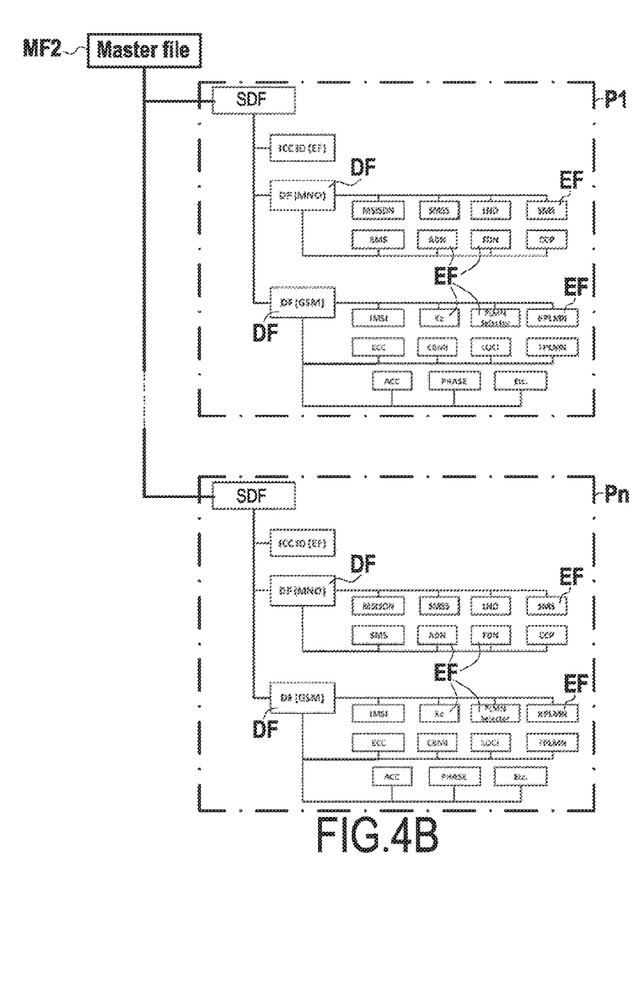
FIG. 4B shows one of various communication profile configurations stored in the FIG. 1 module.

In another example, the profiles P1-Pn are organized with the configuration shown in FIG. 4B. In this second configuration, each profile P1-Pn comprises:

a main directory or "SIM dedicated file" SDF;
secondary directories or "dedicated files" DF; and
elementary files EF.

In this configuration, the main directory SDF of each profile P1-Pn is a subdirectory of a directory or "master file" MF2 that is common to all of the profiles P1-Pn.

The profiles arranged in the first configuration are profiles of a type that is different from the type of the profiles arranged in the second configuration.

Other types of profile include for example "2G" profiles, "3G" profiles, "CDMA" profiles, or a profile specific to a mobile network operator.

Each process of administering is suitable for administering the life cycle of each profile P1-Pn. Each process of administering thus administers the life cycle of each profile P1-Pn, independently of the type of the profile.

In a variant, the non-volatile memory 130 includes a single communication profile P1-Pn.

The module 150 is configured to select one or more communication profiles P1-Pn in the module 100 on the basis of a predefined selection rule for selecting a set RL containing at least one rule, that is contained in the rewritable non-volatile memory 130 in the module 100. By way of example, selection may comply with the 3GPP standard TS 31.102 "Characteristics of the universal subscriber identity module application".

In an example, the rules of the set RL are as follows:
- selecting the most recently activated communication profile P1-Pn of the module 100;
- selecting a priority communication profile P1-Pn from a list or a first register R1 as defined below;
- selecting the sole communication network P1-Pn of the embedded subscriber identity module; or
- selecting a communication profile P1-Pn specified in a command received by the module 100 for selecting a communication profile P1-Pn.

The module 150 is also capable of consulting the first register R1 and a second register R2, these registers R1 and R2 being stored in the non-volatile memory 130.

Figure 5:
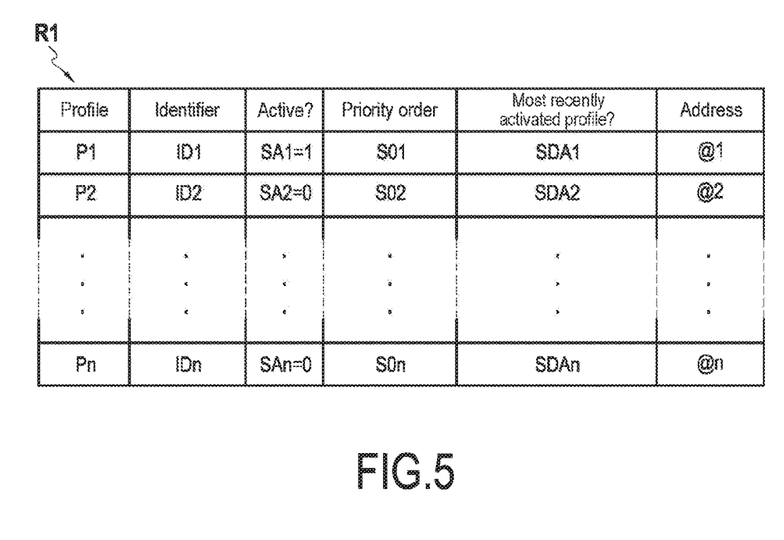
FIG. 5 shows a register stored in the FIG. 1 module.

By way of example, the first register R1 is in the form of a database (cf. FIG. 5) and may comprise for example the following element in association:
- an identifier ID1-IDn of the profile P1-Pn in question;

together with at least one of the following elements:
- a status SA1-SAn of the profile P1-Pn in question, this status SA1-SAn indicating whether or not the profile P1-Pn is active;
- a status SO1-SOn of the profile P1-Pn in question, this status SO1-SOn indicating a selection priority order for the profile P1-Pn;
- a status SDA1-SD1n of the profile P1-Pn in question, this status SDA1-SD1n indicating whether profile P1-Pn is the most recently activated communication profile P1-Pn; and
- a pointer to the memory address @1-@n of the communication profile P1-Pn in question.

In a variant, a plurality of registers replaces the first register R1, each register comprising the identifier ID1-IDn in association with at least one other one of the aforesaid elements.

By way of example, the second register R2 is in the form of a database, and may for example comprise the following elements in association:
- a process of administering suitable for use by the module 100; and
- the set comprising at least one command and/or at least one rule used by the process of administering.

The operating system 120, and more particularly the software module 150, constitutes an example of a computer program in the meaning of the invention, this program including instructions for executing steps of a method for administering profile life cycles performed by the module 100 in a particular embodiment of the invention.

The memory in which the operating system 120 is to be found thus constitutes an example of a data medium in the meaning of the invention, that is readable by a processor (not shown) of the module 100.

The terminal 110 includes an operating system 160 (e.g. stored in a ROM), a non-volatile memory 170, and a communication interface 180 suitable for communicating with the communication interface 140 of the module 110.

Typically, the non-volatile memory 170 is an EEPROM type memory or a flash type memory. The non-volatile memory 170 includes a third register R3 that may be consulted by the operating system 160.

By way of example, the third register R3 is in the form of a database and may comprise for example the following elements in association:
- a process of administering suitable for use by the terminal 110; and
- the set comprising at least one command and/or at least one rule used by the process of administration.

The operating system 160 constitutes an example of a computer program in the meaning of the invention, the program including instructions for executing steps of a method for administering the life cycles of profiles, performed by the terminal 110 in a particular embodiment of the invention.

The memory in which the operating system 160 is to be found thus constitutes an example of a data medium in the meaning of the invention that is readable by a processor (not shown) of the terminal 110.

In an example, the terminal 110 is a mobile telephony terminal. In another example, the terminal 110 is a communication device suitable for co-operating with a subscriber identity module such as an eUICC card or a SIM card. By way of example, the communication device may be any smart object capable of communicating via a telecommunications network with another machine (e.g. an energy consumption meter in a building suitable for communicating via a telecommunications network with an energy supplier).

Figure 2:
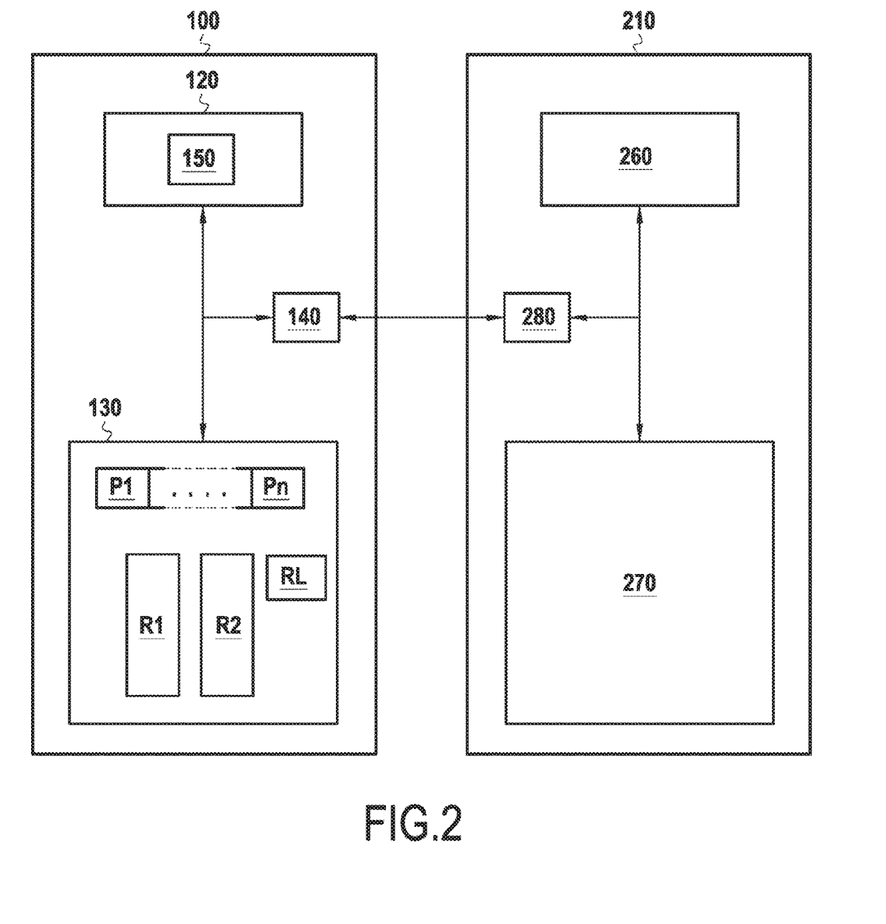
FIG. 2 schematically represents the FIG. 1 subscriber identity module, the module being embedded in a conventional telecommunications terminal.

FIG. 2 shows the subscriber identity module 100 of FIG. 1, the subscriber identity module 100 now being embedded in a conventional telecommunications terminal 210.

The term "conventional communication terminal 210" is used to mean a terminal that is not suitable for using a process of administering. Consequently, the terminal does not enable communication profiles to be installed, uninstalled, activated, or deactivated. Furthermore, the terminal 210 does not enable profile files to be administered, and does not enable switching from one profile to another.

The terminal 110 includes an operating system 160, a non-volatile memory 170, and a communication interface 180 suitable for communicating with the communication interface 140 of the module 110.

Typically, the non-volatile memory 170 is an EEPROM type memory or a flash type memory.

In an example, the terminal 210 is a mobile telephone terminal. In another example, the terminal 210 is a communication device suitable for co-operating with a subscriber identity module such as an eUICC card or a SIM card. By way of example, the communication device may be a communicating smart object as mentioned above, capable of communicating via a telecommunications network with another machine (e.g. an energy consumption meter of a building suitable for communicating via a telecommunications network with an energy supplier).

Figure 3:
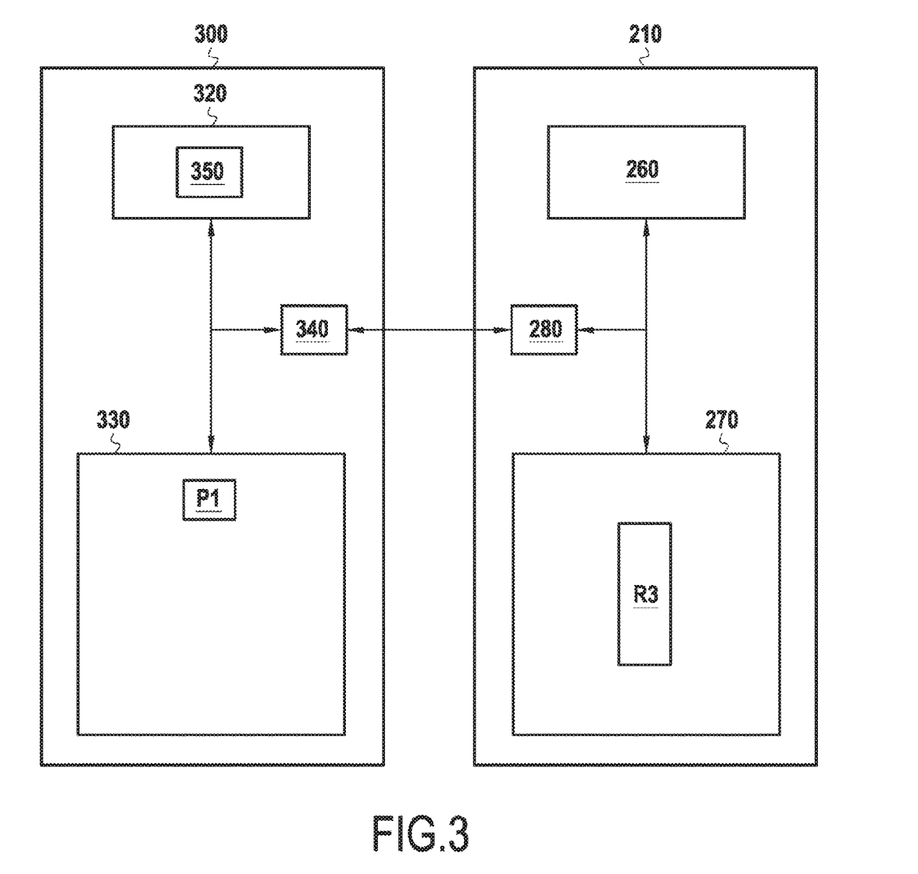
FIG. 3 schematically represents the FIG. 1 telecommunications terminal, in which a conventional subscriber identity module is inserted.

FIG. 3 shows the FIG. 1 telecommunications terminal 110 in which a conventional subscriber identity module 300 is inserted.

In the example of FIG. 3, the subscriber identity module 300 is a SIM card.

The term "conventional subscriber identity module 300" is used to mean a module that is not suitable for using a process of administering. Consequently, the module 300 does not enable communication profiles to be installed, uninstalled, activated, or deactivated. Furthermore, the module 300 does not enable profile files to be administered and does not enable switching from one profile to another.

Specifically, a conventional subscriber identity module has only one profile. That profile is defined by the personalization data of the module 300. The data may include in particular subscription data (e.g. identifiers (IMSI, etc.), cryptographic keys, algorithms (e.g. authentication algorithms) . . . ).

The module 300 includes an operating system 320 e.g. stored in a ROM. The module 300 also includes a rewritable non-volatile memory 330 and a communication interface 340.

Figure 6:
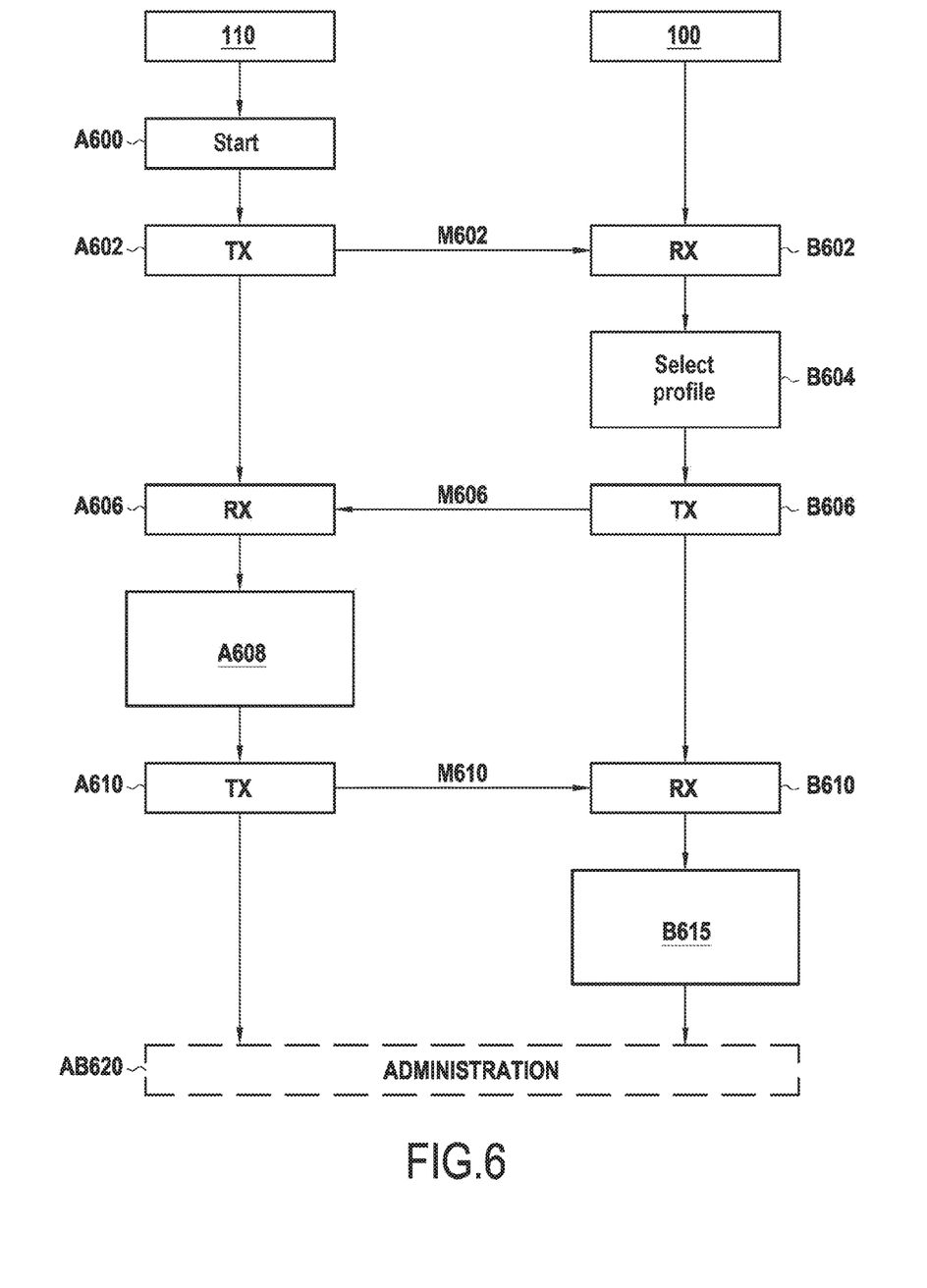
FIG. 6 is a flow chart showing the main steps of a method for administering implemented by the module and the terminal of FIG. 1.

FIG. 6 shows a method for administering life cycles of profiles, which method is performed by the telecommunications terminal 110 of FIG. 1 and the subscriber identity module 100 embedded in the FIG. 1 terminal. The steps B602, B604, B606, B610, and B615 of the method are performed by the module 100, while the steps A600, A601, A606, A608, and A610 of the method are performed by the terminal 110. The step AB620 of the method is performed both by the module 100 and by the terminal 110.

The first step A600 of the method corresponds to the initial starting of the telecommunications terminal 110, when the module 100 is embedded in the terminal 110.

The terminal 110 issues (step A602) a command M602 for selecting a communication profile P1-Pn.

This selection command M602 may include information about the profile P1-Pn desired by the terminal 110. This information may be the identifier ID1-IDn of the desired profile P1-Pn, a path for accessing the main directory MF1 or SDF of the desired profile P1-Pn, or a name of the main directory MF1 or SDF of the desired profile P1-Pn. In an example, the command M602 for selecting a communication profile complies with the APDU "select MF" command as defined in section 6.11 of the ISO 7816-4 standard.

On receiving (step B602) the command M602, the module 100, in a step B604, selects a communication profile P1-Pn in compliance with a predefined selection rule of the set of rules RL.

Thus, in an example, the module 100 consults the statuses SDA1-SDA1 of the first register R1 to determine the most recently activated profile P1-Pn, and then selects (B604) that most recently activated communication profile P1-Pn.

In another example, the module 100 consults the statuses SO1-SOn of the first register R1 to determine the profile P1-Pn having the highest priority selection order and it selects (B604) this priority profile P1-Pn.

In another example, the module 100 selects (B604) the sole communication profile contained in the module 100.

In yet another example that may be used when the selection command M602 includes information about the profile P1-Pn desired by the terminal 100, the module 100 selects (B604) the communication profile P1-Pn corresponding to that information. The module 100 may then consult the first register R1.

The module 100 is thus capable of selecting a communication profile P1-Pn having a main directory that is a subdirectory of a directory that is common to all of the profiles P1-Pn, as shown in FIG. 4B, or a communication profile P1-Pn having a main directory that is not a subdirectory of a directory that is common to all of the profiles P1-Pn, as shown in FIG. 4A.

Thereafter, in a step B606, the module 100 issues a message M606 to the terminal 110. This message M606 includes information about the capabilities of the module 100.

In an example, the information relating to the capabilities of the module 100 comprises:
  information about the process(es) of administering the life cycle of profiles P1-Pn that are supported by the module 100; and/or
  the number of communication profiles P1-Pn stored in the module 100; and/or
  the type of file system supported by the module 100; and/or
  information about the selected communication profile P1-Pn, e.g. its identifier ID1-IDn.

In an example, the message M606 complies with the APDU "MF FCP TLV" command defined in the ISO 7816-4 standard, which includes at least one object of the "BER-TLV" type as defined in the ISO 7816-4 standard or in the ETSI TS 102.221 standard.

Thus, the message M606 including information about the capabilities of the module 100 corresponds at least to a BER-TLV type object. The information about the selected profile is thus included in a BER-TLV type object.

After receiving (step A606) the message M606, the terminal 110, in a step A608, selects or does not select a set of at least one command and/or at least one rule used by a process of administering.

The selection or non-selection of the set is performed as a function of the capabilities of the module 100, transmitted by the message M606, and as a function of the capabilities of the terminal 110.

Typically, the terminal 110 deduces all of the processes of administering supported by the module 100 from the information about the processes of administering supported by the module 100.

Thereafter, the terminal 110 searches for the process(es) that it supports from among the process(es) supported by the module 100.

If the terminal 110 supports a plurality of processes supported by the module 100, the terminal selects one of these processes as a function of a predefined selection rule.

In addition, if the terminal 110 supports one process from among the process(es) supported by the module 100, the terminal 110 selects this process. The terminal 110 then selects the set of at least one command and/or at least one rule used by the selected process. The selected process may then be performed by the terminal 110.

If the terminal 110 does not support any of the processes supported by the module 100 (or does not support the only process it supports), then the terminal 100 does not select a process and does not select a set. The terminal 110 is then not capable of administering life cycles of the profiles P1-Pn. In a variant, if the terminal 110 does not support any of the processes supported by the module 100 (or does not support the only supported process), the terminal 110 selects a predefined process capable solely of administering the files of the selected profile.

In an example, the terminal 110 consults the register R3 to determine whether it supports at least one of the processes of administering supported by the module 100 (or the only supported process), in order optionally to select the set corresponding to the selected process.

Furthermore, in a step A610, the terminal 110 issues a message M610 to the module 100, which message is representative of the capabilities of the terminal 110 (for example the card application toolkit (CAT) capabilities). This message M610 may include information about the capability of the terminal 110 to support a process of administering.

More precisely, if during the step A608 the terminal 110 has selected the set used by the selected process, then the message M610 includes information about the capability of the terminal 110 to use this process. The message M610 issued by the terminal 110 thus includes explicitly the capability of said terminal 110 to support the selected process. In a variant, the message M610 does not include information about the capability of the terminal 110 to use the selected process, and the module 100 deduces this capability of said terminal 110 to support the selected process of administering from other capabilities transmitted in the message M610 issued by the terminal 110.

If the terminal 110 does not select a set during step A608, the message M610 does not have any information about the capability of the terminal 110 for using a process supported by the module 100, or it contains information about the inability of the terminal 110 to use a process supported by the module 100.

In an example, this message M610 issued by the terminal 110 corresponds to a message issued using the "terminal profile" APDU command as defined by the ETSI TS 102.221 standard.

If the message M610 includes information about the capability of the terminal 110 to use a process supported by the module 100, then in a step B615, the module 100 selects, e.g. by consulting the register R2, the set of at least one command and/or at least one rule associated with the process, and that needs to be used by the module 100. Thus, the module 100 selects a set of at least one command and/or at least one rule as a function of the capabilities of the terminal 110 and of the module 100. The process can then be performed by the module 100.

If the message M610 does not have any information about the capability of the terminal 110 to use a process supported by the module 100, or contains information to the effect that the terminal 110 is not able to use a process supported by the module 100, the module 100 does not select a set. The module 100 is then not capable of administering life cycles of the profiles P1-Pn. In a variant, the module selects the predefined process serving solely to administer the files of the selected profile.

In a step AB620, if the module 100 and the terminal 110 have selected a set corresponding to a process supported by the module 100 and by the terminal 110, the module 100 and the terminal 110 administer at least one life cycle of at least one of the profiles P1-Pn by using the selected set. For example, the selected profile P1-Pn may be activated by the module 150 using the selected set. Activation may be performed by changing the status SA1-SAn of the first register R1 listing all of the communication profiles of the module 100.

Figure 7:
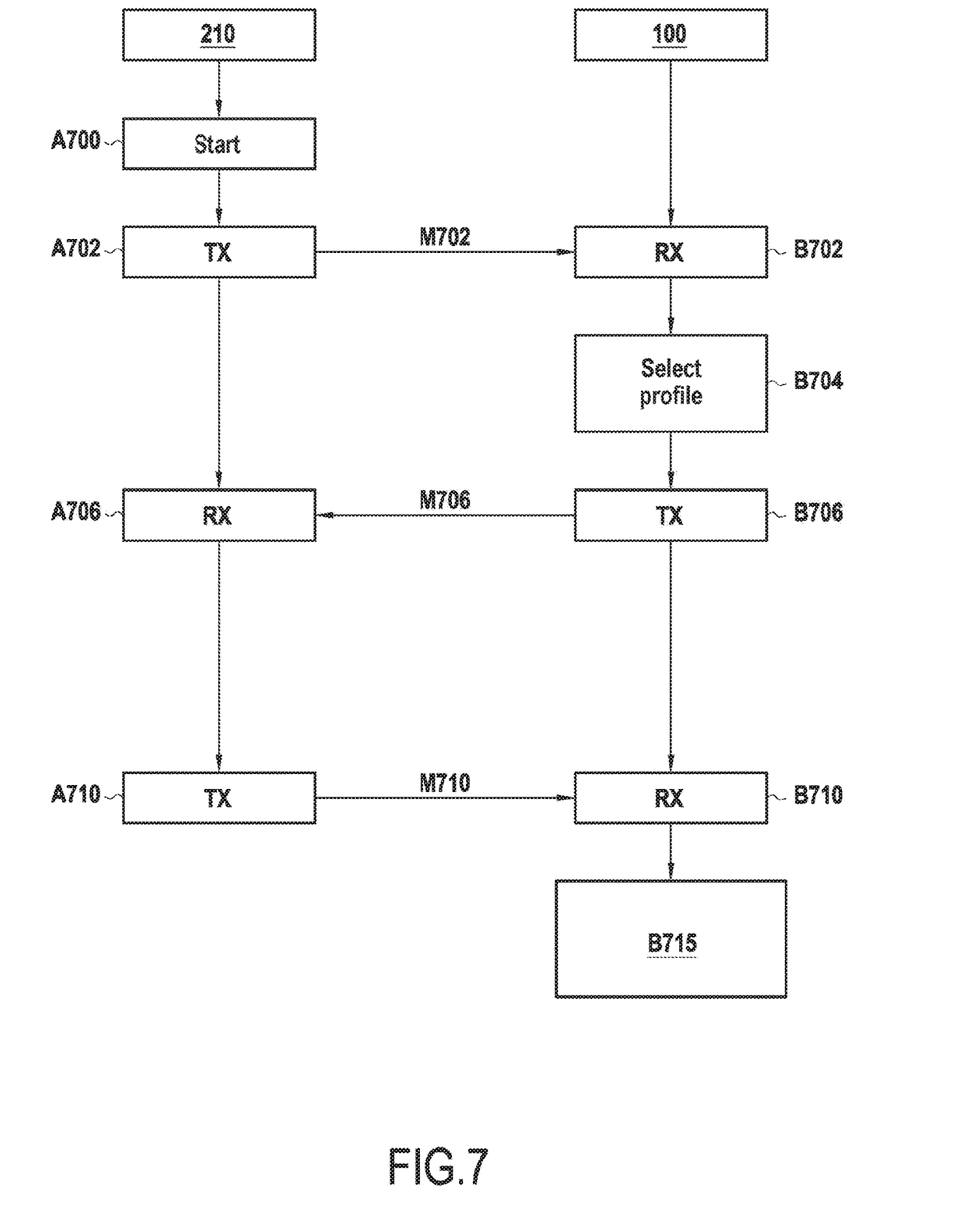
FIG. 7 is a flow chart showing the main steps of a method for administering implemented by the FIG. 2 module.

FIG. 7 shows a method for administering life cycles of profiles that is performed by the subscriber identity module 100 and by the telecommunications terminal 210 of FIG. 2.

The steps B702, B704, B706, B710, and B715 of this method are performed by the module 100, while the steps A700, A702, A706, and A710 of this method are performed by the terminal 210.

The first step A700 of this method corresponds to initial starting of the telecommunications terminal 210, when the module 100 is embedded in the terminal 210.

The terminal 210 issues (step A702) a command M702 for selecting a communication profile P1-Pn.

In an example, the communication profile selection command M702 complies with the "select MF" APDU command defined by section 6.11 of the ISO 7816-4 standard.

On receiving (step B702) the command M702, the module 100, in a step B704, selects a communication profile P1.

Thereafter, in a step B706, the module 100 issues a message M706 to the terminal 110. This message M706 includes information about the capabilities of the module 100.

In an example, the information about the capabilities of the module 100 comprises:
  information about the processes of administering the life cycle of the profiles P1-Pn that are supported by the module 100 (or the only process that is supported); and/or
  the number of communication profiles P1-Pn stored in the module 100; and/or
  the type of file system supported by the module 100; and/or
  information about the selected communication profile P1-Pn, e.g. its identifier ID1-IDn or the profile type P1-Pn.

In an example, this message M706 complies with the "MF FCP TLV" APDU command defined by the ISO 7816-4 standard, which includes at least one "BER-TLV" type object defined by the ISO 7816-4 standard or by the ETSI TS 102.221 standard.

Thus, the message M706 including information about the capabilities of the module corresponds to at least one "BER-TLV" type object. The information about the capabilities of the module is thus included in a "BER-TLV" type object.

On receiving (step A706) the message M706, the terminal 210 does not have any information about the selected communication profile. Specifically, since the terminal 210 is a conventional terminal, it is not suitable for considering and analyzing this data.

In addition, in a step A710, the terminal 110 issues to the module 100 a message M710 representing the capabilities of the terminal 110 (e.g. its CAT capabilities).

In an example, the message M710 issued by the terminal 110 corresponds to a message issued in compliance with the "terminal profile" APDU command as defined by the ETSI TS 102.221 standard.

Since the terminal 210 is a conventional terminal, the message M710 does not include information about the capabilities of the terminal 210 to support a process of administering.

After receiving the message M710, the module 100 does not select a set of commands and rules.

More precisely, the module 100, in a step B715, deduces from the absence of information about the capability of the terminal 210 to support a given process of administering that the terminal 210 is a conventional terminal that is not capable of using a process of administering. The module 100 therefore does not select a process and does not select a set, and the life cycles of the profiles P1-Pn are then not administered. In a variant, the module 100 selects a predefined process serving solely to administer the files of the selected profile.

Figure 8:
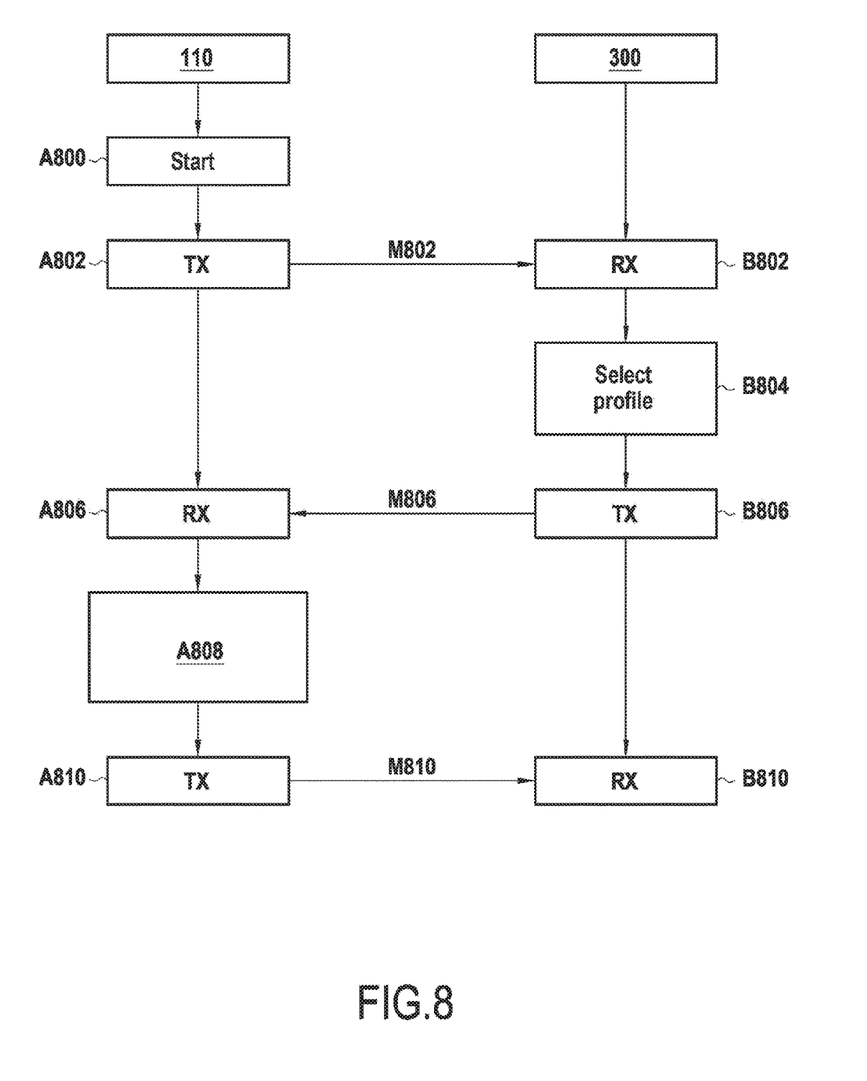
FIG. 8 is a flow chart showing the main steps of a method for administering implemented by the FIG. 3 terminal.

FIG. 8 shows a method for administering life cycles of profiles performed by the telecommunications terminal 110 and the subscriber identity module 300 of FIG. 3. The steps B802, B804, B806, and B810 of this method are performed by the module 300, while the steps A800, A802, A806, A808, and A810 of this method are performed by the terminal 110.

The first step A800 of this method corresponds to initial starting of the telecommunications terminal 110 when the module 300 is embedded in the terminal 110.

In step A802, the terminal 110 issues a command M802 to select a communication profile P1-Pn.

This selection command M802 may include information about the profile P1-Pn desired by the terminal 110. This information may be an identifier ID1-IDn of the desired profile P1-Pn, a path for accessing the main directory MF1 or SDF of the desired profile P1-Pn, or a name of the main directory MF1 or SDF of the desired profile P1-Pn. In an example, the communication profile selection command M802 complies with the "select MF" APDU command defined by section 6.11 of the ISO 7816-4 standard.

On receiving (in step B802) the command M802, the module 300, in a step B804, selects the sole "profile" P1 stored in the non-volatile memory 330 of the module 300 (i.e. the personalization data).

Thereafter, in a step B806, the module 300 issues a message M806 to the terminal 110. This message M806 includes information about the selected communication profile P1.

In an example, the information relating to the selected profile P1 describes the life cycle handling capabilities of the profile.

In an example, this message M806 complies with the "MF FCP TLV" APDU command defined by the ISO 7816-4 standard, and includes at least one "BER-TLV" type object as defined by the ISO 7816-4 standard or by the ESTI TS 102.221 standard.

Thus, the M806 message including information about the selected communication profile corresponds to at least one "BER-TLV" type object. The information relating of the selected profile is thus included in a "BER-TLV" type object.

After receiving (step A806) the message M806, the terminal 110 deduces from the absence of information about the processes of administering supported by the module 100 that the module 300 is a conventional module that cannot use a process of administering (step A808). The terminal 110 therefore does not select a set.

Furthermore, in a step A810, the terminal 110 issues to the module 300 a message M810 representing the capabilities of the terminal 110 (e.g. its CAT capabilities).

In an example, the message M810 issued by the terminal 110 corresponds to a message issued using the "terminal profile" APDU command defined by the ETSI TS 102.221 standard. This message M810 includes information about the capability of the terminal to support at least one process of administering life cycles of profiles.

On receiving (step B810) the message M810, the module 300 has no information about the capability of the terminal to support a process of administering. Specifically, since the module 300 is a conventional module, it is not suitable for taking this data into consideration and analyzing it. The life cycle of the profile P1 is then not administered.

The method thus makes it possible to administer the life cycles of profiles only when the terminal and the module both support a common process of administering. Otherwise, life cycles of profiles are not administered. It is then, by way of example, to switch from one profile to another. This makes it possible to limit the errors of operation of the module and/or of the terminal, since it is impossible for the module and the terminal to use two different processes of administering, making use of commands and/or rules that are different.

The invention claimed is:

1. An administering method for administering life cycles of communication profiles, said profiles being managed by a subscriber identity module embedded in a telecommunications terminal, said method being performed by said module,
    each profile being configured to enable the terminal to communicate with a mobile telephone network in compliance with a communication profile when said communication profile is active,
    said module being suitable for using at least one process of administering, said process being suitable for administering the life cycles of each of said profiles, said process using a set of at least one command and/or at least one rule,
    the method comprising:
    receiving a first message issued by the terminal and representative of capabilities of said terminal;
    selecting or not selecting the set used by said process as a function of said capabilities of said terminal;
    issuing a second message to the terminal including information about the capabilities of the module, wherein the second message comprises information about the process of administering the life cycles of the profiles that are supported by the module; and
    if said set is selected, administering at least one life cycle of at least one of said profiles by using said set of at least one command and/or of at least one rule.

2. The administering method according to claim 1, wherein the first message issued by the terminal includes explicitly the capability of said terminal to use said process.

3. The administering method according to claim 1, wherein selecting or not selecting said set is also a function of the capabilities of said module.

4. The administering method according to claim 1, further comprising:
    receiving a command for selecting a profile as issued by the terminal; and
    selecting one of said profiles.

5. The administering method according to claim 4, wherein said communication profile is selected depending on a predefined selection rule stored in a non-volatile memory of said module.

6. The administering method according to claim 5, wherein the rule for selecting a profile is a rule from among the following rules:
    selecting the most recently activated communication profile of said module;
    selecting a priority communication profile in a list stored in said module;
    selecting the sole communication profile of the embedded subscriber identity module; or
    selecting a communication profile specified in the command for selecting a communication profile.

7. The administering method according to claim 1, wherein the second message including information about the capabilities of said module includes:
    information about said process of administering used by said module; and/or
    the number of communication profiles stored in said module; and/or
    the type of file system supported by said module; and/or
    information about the selected communication profile.

8. The administering method according to claim 1, wherein the second message including information about the capabilities of said module corresponds to at least one "BER-TLV" type object defined by the ISO 7816-4 standard or by the ETSI TS 102.221 standard.

9. An administering method for administering life cycles of communication profiles, said profiles being supported by a telecommunications terminal suitable for co-operating with a subscriber identity module embedded or inserted in said terminal, said method being performed by said terminal,
each profile being configured to enable the terminal to communicate with a mobile telephone network in compliance with a communication profile when said communication profile is active,
said terminal being suitable for using at least one process of administering, said process being suitable for administering the life cycles of each of said profiles, said process using a set of at least one command and/or of at least one rule,
said method comprising:
issuing a message representative of the capabilities of said terminal to said module;
receiving a message including information about the capabilities of said module, said message coming from said module;
selecting or not selecting the set used by said process as a function of said information the capabilities of said module; and
if said set is selected, administering at least one life cycle of at least one of said profiles by using said set of at least one command and/or of at least one rule.

10. The administering method according to claim 9, wherein the method is performed the first time the telecommunications terminal is started.

11. The administering method according to claim 9, further comprising:
issuing a command for selecting a communication profile to said module.

12. The administering method according to claim 4, wherein the command for selecting a communication profile complies with the "select file" APDU command defined by the ISO 7816-4 standard.

13. The administering method according to claim 1, wherein said first message issued by the terminal corresponds to a message issued using the "terminal profile" APDU command defined by the ESTI TS 102.221 standard, further including additional data specifying that the terminal is suitable for using said process of administering.

14. A subscriber identity module embedded in a telecommunications terminal,
said module being suitable for managing a plurality of communication profiles,
each profile being configured to enable the terminal to communicate with a mobile telephone network in compliance with a communication profile when said communication profile is active,
said module being suitable for using at least one process of administering, said process being suitable for administering the life cycles of each of said profiles, said process using a set of at least one command and/or at least one rule,
said module operable to perform a method comprising:
receiving a first message issued by the terminal, said first message-being representative of the capabilities of said terminal; and
selecting or not selecting the set used by said process, as a function of said capabilities of said terminal;
issuing a second message to the terminal including information about the capabilities of the module, wherein the second message comprises information about the process of administering the life cycles of profiles that are supported by the module; and
administering at least one life cycle of at least one of said profiles, using said set of at least one command and/or of at least one rule, if said set is selected.

15. The subscriber identity module according to claim 14, wherein the selecting or not selecting a set selects the set as a function also of the capabilities of said module.

16. A telecommunications terminal suitable for co-operating with a subscriber identity module embedded or inserted in said terminal,
said terminal being suitable for supporting a plurality of communication profiles,
each profile being configured to allow the terminal to communicate with a mobile telephone network in compliance with a communication profile when said communication profile is active,
said telecommunications terminal being suitable for using at least one process of administering, said process being suitable for administering the life cycles of each of said profiles, said process using a set of at least one command and/or of at least one rule,
said terminal comprising:
means for sending a message representative of the capabilities of said terminal to said module;
means for receiving a message including information about the capabilities of said module, said message coming from said module; and
means for selecting or not selecting said set used by said process as a function of said information about the capabilities of said module; and
means for administering at least one life cycle of at least one of said profiles by using said set of at least one command and/or of at least one rule, if said set is selected.

17. A non-transitory processor-readable data medium storing a computer program including instructions for executing steps of an administering method according to claim 1.

18. A non-transitory processor-readable data medium storing a computer program including instructions for executing steps of an administering method according to claim 9.

19. The administering method according to claim 11, wherein the command for selecting a communication profile complies with the "select file" APDU command defined by the ISO 7816-4 standard.

20. The administering method according to claim 9, wherein said message issued by the terminal corresponds to a message issued using the "terminal profile" APDU command defined by the ESTI TS 102.221 standard, further including additional data specifying that the terminal is suitable for using said process of administering.

21. The administering method according to claim 1, wherein the process of administrating the life cycle of profile enables communication profile to be installed, uninstalled, activated, and deactivate.

* * * * *